US009897224B2

(12) United States Patent
Neuhaus

(10) Patent No.: US 9,897,224 B2
(45) Date of Patent: Feb. 20, 2018

(54) MAGNETICALLY ACTUATABLE VALVE DEVICE

(71) Applicant: Dietmar Neuhaus, Düsseldorf (DE)

(72) Inventor: Dietmar Neuhaus, Düsseldorf (DE)

( * ) Notice: Subject to any disclaimer, the term of this patent is extended or adjusted under 35 U.S.C. 154(b) by 29 days.

(21) Appl. No.: 15/100,012

(22) PCT Filed: Nov. 19, 2014

(86) PCT No.: PCT/EP2014/074996
§ 371 (c)(1),
(2) Date: May 27, 2016

(87) PCT Pub. No.: WO2015/078741
PCT Pub. Date: Jun. 4, 2015

(65) Prior Publication Data
US 2017/0002951 A1 Jan. 5, 2017

(30) Foreign Application Priority Data
Nov. 27, 2013 (DE) .......................... 10 2013 224 286

(51) Int. Cl.
*F16K 31/06* (2006.01)
*F16K 15/04* (2006.01)
*F16K 15/18* (2006.01)

(52) U.S. Cl.
CPC .......... *F16K 31/0662* (2013.01); *F16K 15/04* (2013.01); *F16K 15/042* (2013.01);
(Continued)

(58) Field of Classification Search
CPC ............. F16K 31/0651; F16K 31/0662; F16K 31/0665; F16K 31/0675; F16K 15/183; F16K 15/04; F16K 15/042
See application file for complete search history.

(56) References Cited

U.S. PATENT DOCUMENTS 2,056,322 A * 10/1936 Hoppe ................ F16K 31/0662
251/129.14
3,828,818 A   8/1974 Hunt
(Continued)

FOREIGN PATENT DOCUMENTS

DE      19922414 C1    11/2000
DE      10359852 B3    6/2005
(Continued)

OTHER PUBLICATIONS

International Search Report and Written Opinion dated Feb. 19, 2015 from corresponding International Patent Application No. PCT/EP2014/074996; 11 pgs.

*Primary Examiner* — Atif Chaudry
(74) *Attorney, Agent, or Firm* — Maier & Maier, PLLC

(57) ABSTRACT

A magnetically actuatable valve device, including an inner chamber delimited by at least one wall of magnetizable material, which wall forms a valve seat, and a magnet arrangement which generates a magnetic circuit with magnetic flux running in the magnetizable wall, and at least one magnetizable valve body which is moveable in the inner chamber, wherein at least one intermediate element is arranged in the wall extending around the inner chamber and with reduced magnetic conductivity in comparison with the wall, wherein the intermediate element includes a recess where a projection of the wall extends, where two magnetizable guide elements are arranged in the inner chamber on opposite sides of the valve body; and offset to the recess, wherein the guide elements guide the valve body and together with the wall form the magnetic circuit, wherein magnetic flux runs through the wall, the valve body, and guide elements.

9 Claims, 7 Drawing Sheets

(52) U.S. Cl.
CPC ........ *F16K 15/183* (2013.01); *F16K 31/0631* (2013.01); *F16K 31/0651* (2013.01); *F16K 31/0665* (2013.01); *F16K 31/0675* (2013.01)

(56) References Cited

U.S. PATENT DOCUMENTS

| | | | |
|---|---|---|---|
| 9,642,233 B2 * | 5/2017 | Sylla | ...................... H05G 2/006 |
| 2008/0224077 A1 | 9/2008 | Neuhaus | |
| 2008/0290304 A1 | 11/2008 | Neuhaus | |
| 2011/0284778 A1 | 11/2011 | Neuhaus | |
| 2012/0000991 A1 * | 1/2012 | Hloben | ................. A01M 7/006 |
| | | | 239/159 |

FOREIGN PATENT DOCUMENTS

| | | |
|---|---|---|
| DE | 102005035878 B3 | 8/2006 |
| DE | 102009006987 B3 | 9/2010 |
| WO | 2010086241 A1 | 8/2010 |

\* cited by examiner

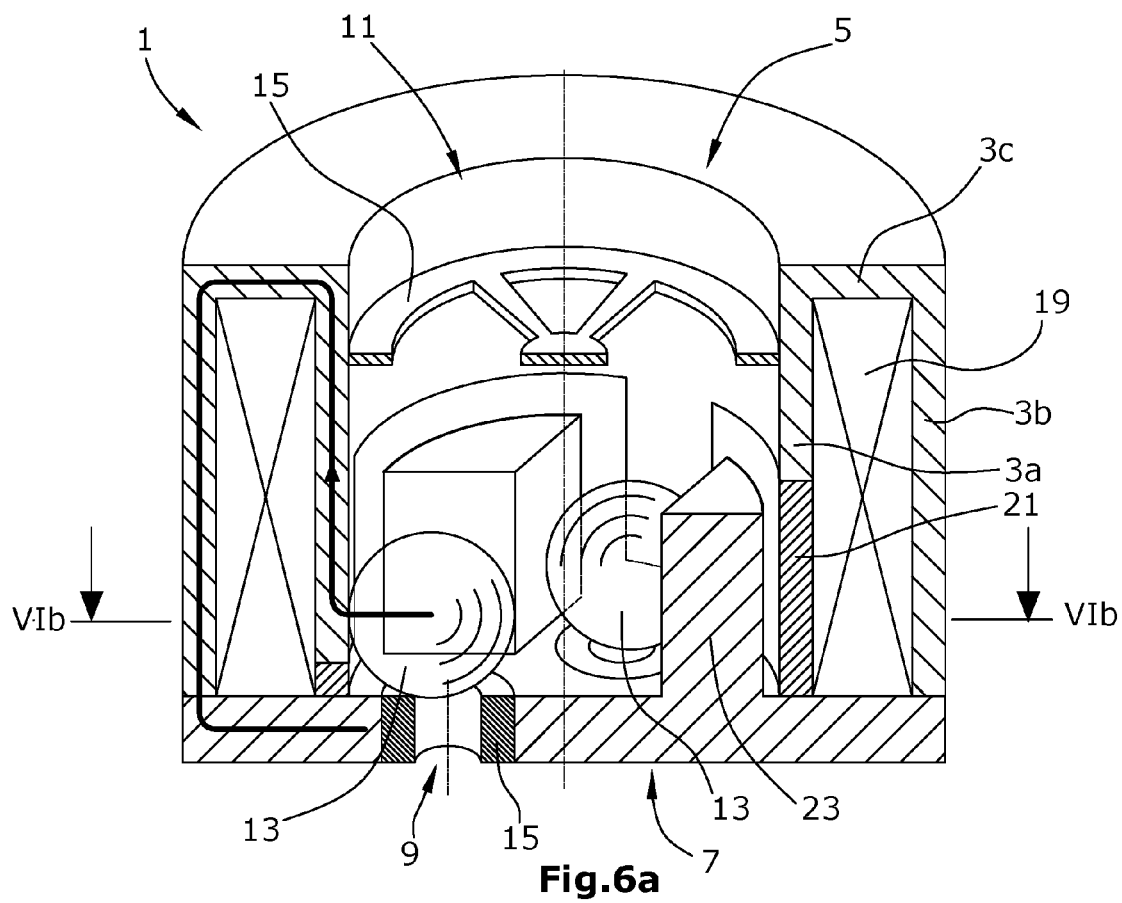
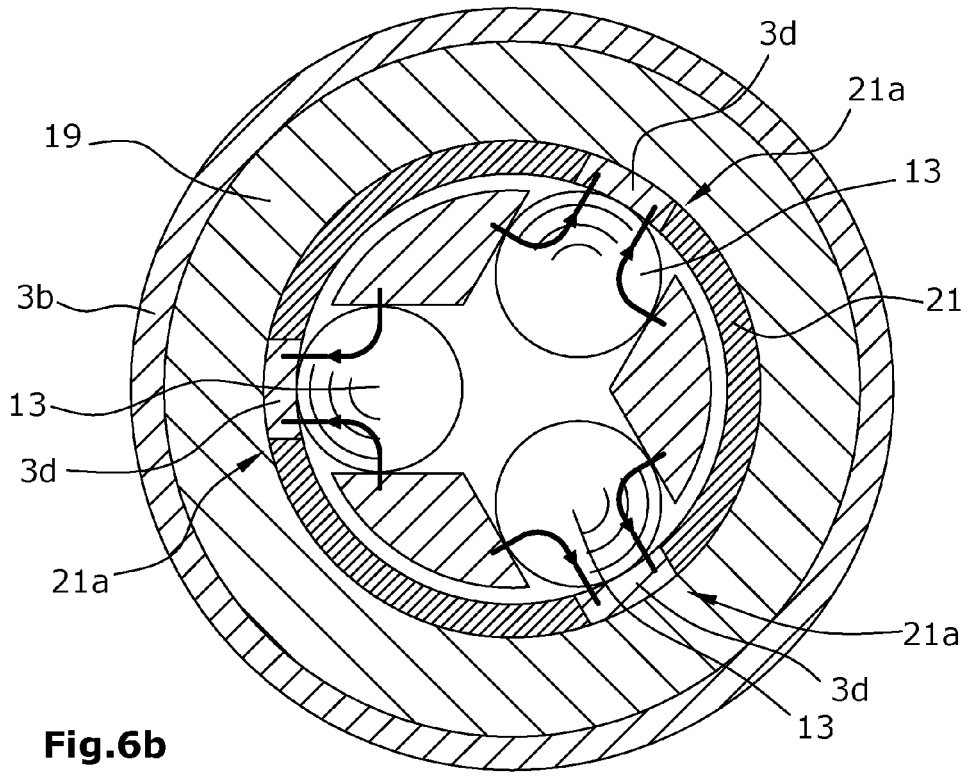
Fig.6a
Fig.6b

MAGNETICALLY ACTUATABLE VALVE DEVICE

BACKGROUND OF THE INVENTION

Field of the Invention

The present invention relates to a magnetically actuatable valve device.

Description of the Related Art

DE 199 22 414 C1 (DLR) describes a magnetic valve wherein the valve body is pressed into the valve seat by only the differential pressure between the valve inlet and the valve outlet. The valve opens when a magnetic field acting on the valve body from the side moves the valve body away from the valve opening. For this purpose, the valve body is designed as a magnetizable ball. At the height of the valve body, the magnetizable wall of the valve housing has a point of discontinuity which deforms the magnetic field and at which the magnetic field exerts a force on the valve body, which is directed parallel to the valve seat. Due to the point of discontinuity the magnetic flux passes from the wall into the valve body and back from the same into the wall. The magnetic flux through the valve body is a measure of the force with which the valve body is moved away from the valve opening. The magnetic valve closes when, after the magnetic field is deactivated, the valve body is carried back onto the valve opening by only the flow. In the known valve, the magnetizable wall forms a magnetic circuit with the valve body.

DE 10 2005 035 878 B3 (DLR) describes a valve device according to the preamble of claim 1. Also in this magnetic valve, the magnetizable closure element is pressed into the valve seat by only the differential pressure between the valve inlet and the valve outlet. The magnetizable wall includes at least one intermediate section of a non-magnetizable material. The valve seat is made from a magnetizable material and forms the magnetic circuit together with the closure element and the magnetizable wall. Due to the magnetizable valve seat, the magnetic flux can flow from the closure element into the magnetizable wall via the valve seat with little magnetic reluctance.

SUMMARY OF THE INVENTION

It is an object of the present invention to provide a magnetically actuatable valve that is able to exert a great force on the valve body.

The magnetically actuatable valve device of the present invention is defined by the features defined herein.

The magnetically actuatable valve device of the present invention has an inner chamber delimited by at least one wall of magnetizable material, the magnetizable wall forming a valve seat. A magnet arrangement forms a magnetic circuit with a magnetic flux running in the magnetizable wall. At least one magnetizable valve body is movably arranged in the inner chamber. In the inner chamber, at least one intermediate element is arranged that extends around the inner chamber and has a lower magnetic conductivity than the magnetizable wall, wherein the intermediate element has a first recess into which a projection of the magnetizable wall extends that protrudes in the axial direction of the valve device. In other words: The region of a material with reduced magnetic conductivity formed by the intermediate element has different axial extensions on two opposite sides.

The valve device of the present invention is characterized in that two guide elements of magnetizable material are arranged on opposite sides of the valve body in the inner chamber and offset with respect to the first recess or the projection, wherein the guide elements form the magnetic circuit together with the magnetizable wall and the magnetic flux runs through the wall, the valve body and the guide elements.

The force exerted on the valve body is a function of the magnetic flux flowing through the valve body. A large magnetic flux also means a great magnetic force acting on the valve body. The magnetic flux enters the valve body and exits therefrom. With a given magnetic potential difference, a low magnetic reluctance in the magnetic circuit is advantageous, in order to obtain a large magnetic flux. The magnetic reluctance in the magnetic circuit depends on the gap widths between the valve body and the magnetizable wall or the guide elements. By providing the guide elements it is achieved that only relatively narrow gaps have to be overcome in the magnetic circuit so that the magnetic reluctance is low in the magnetic circuit. Thereby, a great force is exerted on the valve body. Since the guide elements guide the valve body, it is ensured that the gap between the valve body and the guide elements remains relatively small during the opening movement of the valve body so that a low magnetic reluctance exists between the valve body and the guide elements during the entire opening movement. The gap width between a guide element and the valve body may be 5:100 mm, for example.

The guide elements also cause a force on the valve body that is generated by the magnetic flux. However, since the guide elements are arranged on opposite sides of the valve body, the forces exerted by the guide elements on the valve body act in an opposite direction so that the forces fully or almost fully compensated. The gap between the guide elements and the valve body may be designed as a sliding fit for example, wherein, due to the forces exerted on the valve body by the guide elements, the valve body is held centrally between the guide elements, whereby the frictional forces between the guide elements and the valve body can be kept low.

The intermediate element causes the magnetic field lines to exit the magnetizable wall at this site when a body with a higher magnetic conductivity is near the point of discontinuity thus formed. Such a body is formed by the valve body. The projection on the magnetizable wall that extends into the first recess in the intermediate element forms an asymmetry in the magnetic field since the distance between this projection and the valve body is smaller than it is on the opposite side between the region of the magnetizable wall situated above the intermediate element and the valve body. Thereby, an increased force of attraction is generated on the valve body in the direction of the projection. The magnetic flux through the wall, the valve body and the guide elements is achieved due to the fact that, at the part of the magnetizable wall directed to the inner chamber, there is no direct connection of magnetizable material between the projection of the magnetizable wall and the guide elements, but a separation exists between them in the form of the intermediate element.

The guide elements may be arranged offset by e.g. 90° with respect to the first recess or the projection.

Preferably it is provided that the guide elements cause the inner chamber to taper. Thereby, the valve body can be guided in an advantageous manner, wherein it is possible to create a gap as small as possible between guide elements and the valve body. For example, if a ball-shaped valve body and a round inner chamber are provided, the guiding of the valve body can be realized in a particularly advantageous manner by means of the guide elements causing a taper in the inner chamber, while the valve device of the present invention may in addition have a structurally simple design.

In an embodiment of the invention it is provided that the guide elements are formed by magnetizable inserts in the magnetizable wall, the inserts extending into second recesses of the intermediate element. As an alternative it may be provided that the guide elements are formed by tongues extending in the axial direction parallel to the intermediate element.

Thus, the guide elements can be provided in a structurally simple manner.

The projection and the guide elements extend axially in opposite directions from the magnetizable wall. Thereby is can be achieved in an advantageous manner that the region of the magnetizable wall from which the projection extends and the part of the magnetizable wall from which the guide elements extend are not in direct contact in the region of the magnetizable wall directed to the inner chamber, but are separated by the intermediate element. The projection may for example extend from the part of the magnetizable wall surrounding a valve inlet towards a valve outlet. The guide elements may for example extend from the region of the magnetizable wall surrounding the valve outlet towards the valve inlet.

In a particularly preferred embodiment of the invention it is provided that the guide elements extend in an axial direction from the valve seat into the inner chamber. The guide elements may for example be formed integrally with the valve seat, whereby the guide elements can be provided in a structurally simple manner.

In an embodiment of the valve device of the present invention it is provided that the valve seat has a valve opening offset with respect to the valve centre axis. The valve opening may e.g. offset towards the first recess. Thereby, it is possible to create a particularly small distance between the projection of the magnetizable wall and the valve body, whereby a low magnetic reluctance and thus a great magnetic force on the valve body can be generated. In this regard, it may be provided that another first recess is arranged opposite the first recess, the magnetizable wall extending into the former with another projection. In this case, the two first recesses and the two projections are symmetrical, wherein asymmetry is caused by the valve opening arranged offset from the valve centre axis, whereby it becomes possible to generate an increased force of attraction on the valve body.

In an embodiment of the invention it may be provided that, seen in the direction towards the first recess, the distance between the guiding elements decreases. The surface of the guide elements facing the valve body is thus curved, so that the gap between the guide elements and the valve body is reduced during the opening movement of the valve body. In addition, the curved surface of the guide elements is advantageously adapted to a, for example, ball-shaped valve body, so that during the opening movement of the valve body an enlarged surface with a small distance from the valve body is formed. In other words: during the opening movement, the valve body is embraced to an ever increasing extent by guide elements. Thereby, the magnetic reluctance between the guide elements and the valve body decreases.

The invention advantageously provides that the valve body is ball-shaped or barrel-shaped. A barrel shape is understood as a ball shape with opposite removed ball segments, whereby opposite flat parts are formed. In a particularly advantageous manner, a valve body of such design can roll in at least one direction. In addition, such a valve body advantageously allows a valve opening to be covered in a sealed manner. Further, with the flat parts, it is achieved that these can be arranged directly opposite the guide elements, whereby a very large effective area is formed between the valve body and the guide elements with a small distance therebetween, so that a particularly low magnetic reluctance is generated.

In an embodiment of the invention it is provided that the valve device has three valve bodies, three valve openings in the valve seat, three first recesses in the intermediate element into which the magnetizable wall extends with a respective projection, and three guide elements, the three guide elements being arranged offset with respect to the three first recesses, and wherein one of the valve bodies is laterally enclosed and guided by two of the guide elements, respectively. In such a valve device, a respective valve body is assigned to a valve opening. Two respective guide elements form a guide for a valve body so that a guide element respectively cooperates with two valve bodies. The magnetic flux flows from the guide elements to the projections of the magnetizable wall via the respective valve bodies. Further, one of the projections of the magnetizable wall is assigned to each of the valve bodies. As the valve device opens, each of the valve bodies is pulled in the direction of the projection of the magnetizable wall assigned thereto, so that the valve opening is cleared. In this embodiment of the valve device the three valve openings are arranged eccentrically.

The intermediate element may be made of an amagnetic material so that in normal use the intermediate element is not magnetizable. Preferably, the inner chamber is circular, with guide elements causing a taper in one region so that in this region an out-of-roundness is formed. A valve opening in the valve seat may comprise a sealing insert made of magnetic or amagnetic material.

BRIEF DESCRIPTION OF THE DRAWINGS

The following is a detailed description of the invention with reference to the following Figures.

In the Figures:

FIG. 6a shows a schematic sectional view of a sixth embodiment of a valve device with three valve bodies.

FIG. 6b shows a schematic sectional view of a sixth embodiment of a valve device with three valve bodies.

DETAILED DESCRIPTION

Figure 1A:
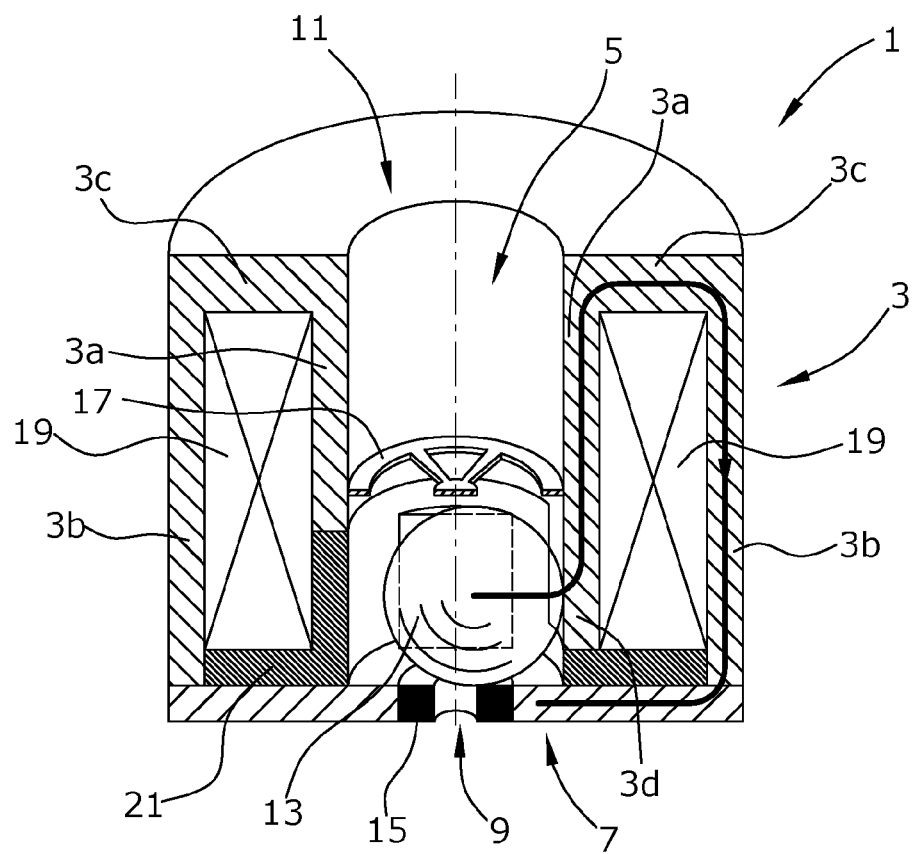
FIG. 1a shows a sectional view of a first embodiment of a valve device.
Figure 1B:
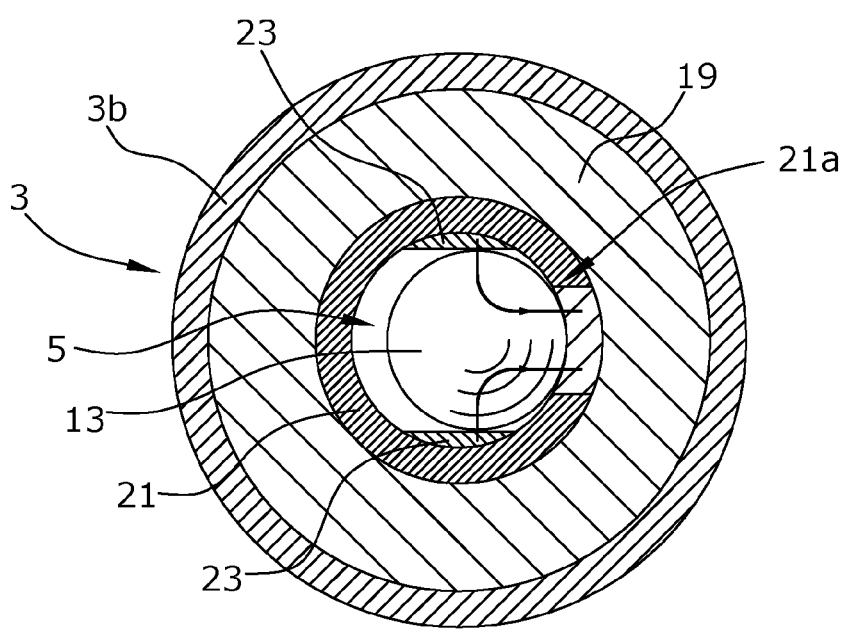
FIG. 1b shows a sectional view of a first embodiment of a valve device.
Figure 1C:
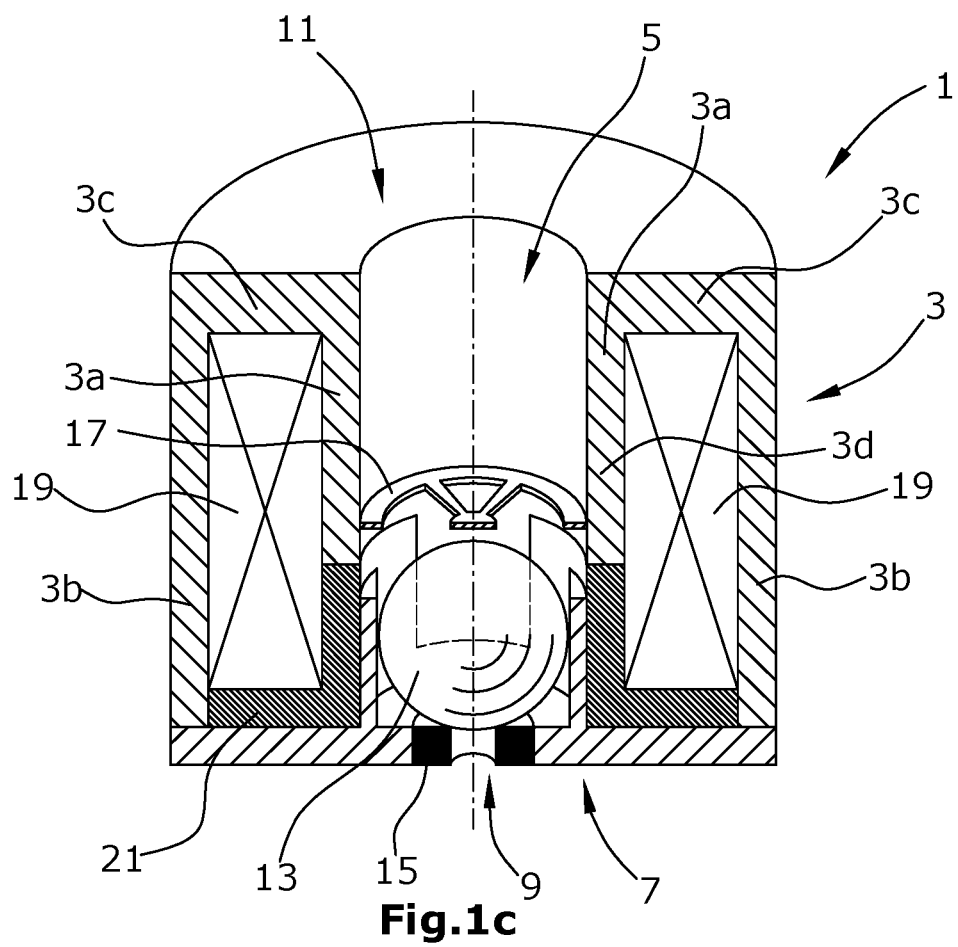
FIG. 1c shows a sectional view of a first embodiment of a valve device.

In FIGS. 1a-1c different sectional views of a magnetically actuatable valve device 1 of the present invention are schematically illustrated. FIG. 1a is a longitudinal section of the valve device 1 in the open state, with the magnetic flux lines being shown. FIG. 1b is a transversal section of the valve device in the state illustrated in FIG. 1a, and FIG. 1c is a schematic illustration of a longitudinal section, with the longitudinal section in FIG. 1c being rotated by 90° with respect to the section shown in FIG. 1a. In FIG. 1c the valve is illustrated in the closed position.

The valve device 1 has a magnetizable wall 3 that defines an inner chamber 5. The magnetizable wall 3 further forms a valve seat 7 that forms a valve opening 9. The valve opening 9 forms the valve outlet, whereas a valve inlet 11 into the inner chamber 5 is formed on the opposite side. A valve boy 13 is arranged inside the inner chamber 5, which in the embodiment illustrated in FIGS. 1a-1c is designed as a ball. The valve opening 9 may be closed by means of the valve body 13 using a differential pressure between the valve inlet 11 and the valve outlet 9. For this purpose, the valve seat 7 may have a sealing insert 15 that surrounds the valve opening 9. The sealing insert 15 may be made of a magnetic or amagnetic material. The valve body 13 is movable in the inner chamber 5 parallel to the valve seat 7, as well as vertically to the valve seat 7. The movement vertical to the valve seat 7 is limited by a catching device 17 arranged in the inner chamber 5.

The magnetizable wall 3 is formed annularly around the inner chamber 5 and has an annular cavity for a magnet arrangement 19. The magnet arrangement 19 annularly surrounds an inner leg 3a of the wall 3, while the magnet arrangement 19 is itself enclosed by an outer leg 3b of the wall 3. The inner leg 3a and the outer leg 3b are connected at the upper end by an annular plate 3c.

The outer leg 3b is in direct contact with the valve seat 7, wherein the valve seat 7 forms a plate that delimits the inner chamber 5 in the downward direction. The wall 3 with the inner leg 3a, the outer leg 3b, the annular plate 3c, as well as the valve seat 7, is made of a magnetizable material, e.g. of iron or magnetizable stainless steel.

An intermediate element 21 is arranged between the inner leg 3a and the valve seat 7 so that there is no direct contact between the inner leg 3a and the valve seat 7. Further, the intermediate element 21 is also arranged between the magnet arrangement 19 and the valve seat 7.

The intermediate element is made of a material of low magnetic conductivity. The conductivity may also be zero. The intermediate element 21 has a first recess 21a that is best seen in FIG. 1b. The inner leg 3a of the magnetizable wall 3 axially extends into the first recess 21a by a projection 3d, the projection 3d still being separated from the valve seat 7 by the intermediate element 21. As can be seen in FIG. 1a, the intermediate element 21 thus extends axially over different lengths on two opposite sides.

The projection 3d extends in the axial direction from the inner leg 3a towards the valve seat 7 and thus in a direction from the valve inlet 11 towards the valve outlet.

From the valve seat 7, two guide elements 23 extend into the inner chamber 5. The guide elements are arranged on opposite sides of the valve body 13 and guide the same.

Further, the guide elements 23 are arranged offset by 90° relative to the first recess 21a and thus to the projection 3d.

Due to the projection 3d, the inner leg 3a has a greater length in this region, when compared to the opposite side, whereby when a magnetic field is generated an inhomogeneity of the magnetic field is produced that is caused by the intermediate element. Thus, an asymmetry is caused, whereby a force is exerted on the valve body 13 that acts in the direction of the projection 3d so that the valve body is pulled from the valve opening towards the projection 3d. The corresponding magnetic flux lines are indicated in FIGS. 1a and 1b. The magnetic flux extends from the valve seat 7 of the magnetizable wall 3 via the guide elements 23 into the valve body 13 and from the valve body 13 back into the wall 3 via the projection 3d. In the valve device of the present invention the magnetic circuit has to overcome only relatively small gaps so that a low magnetic reluctance exists. Thus, a very great force can be exerted on the valve body 13. The guide elements 23 form a sliding fit with the valve body 13 wherein only a very small gap is formed. Owing to the fact that the guide elements 23 are arranged opposite each other around the valve body, magnetic forces exerted by the guide elements 23 on the valve body 13 are compensated. Further, these forces hold the valve body 13 centrally between the guide elements 23 so that only a movement towards the projection 3d occurs.

As best seen in FIG. 1c, in which the valve is illustrated in the closed state, the guide elements 23 are formed by two tongues extending axially in parallel with the intermediate element 21.

Figure 2A:
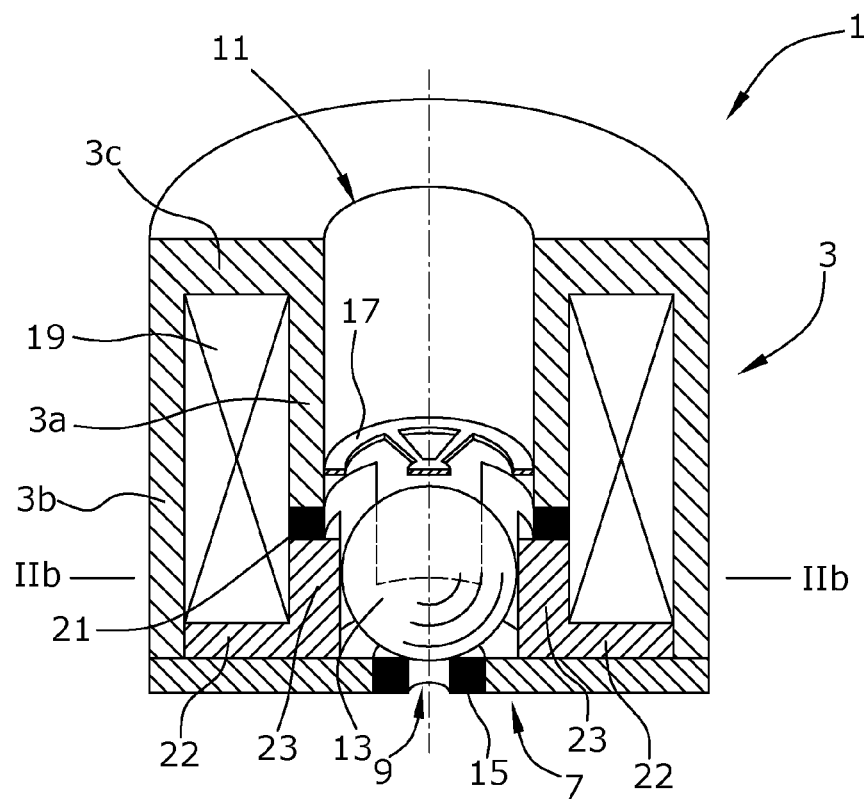
FIG. 2a shows a sectional view of a second embodiment of a valve device.
Figure 2B:
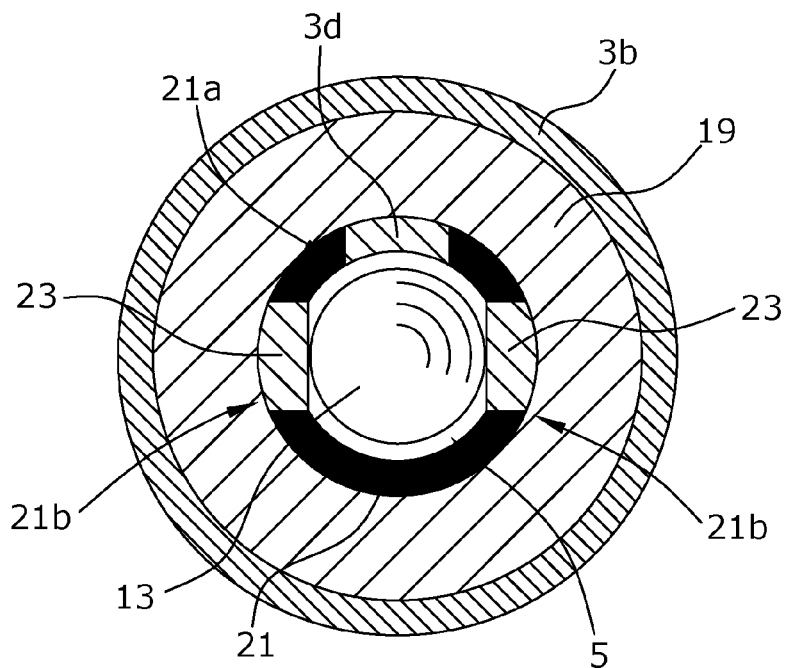
FIG. 2b shows a sectional view of a second embodiment of a valve device.

FIGS. 2a and 2b schematically illustrate a second embodiment of the valve device 1 in two sectional views. In FIG. 2a the valve is schematically shown in longitudinal section. FIG. 2b shows a transversal sectional view of the valve device 1.

The embodiment in FIGS. 2a and 2b differs from the valve device illustrated in FIGS. 1a-1c in that the guide elements 23 are not formed as tongues arranged in parallel with the intermediate element 21, but as magnetizable inserts 22. The intermediate element 21 has two second recesses 21b into which the inserts 22 extend. The inserts 22 thus form a part of the wall 3, with the inserts being thicker than the inner legs 3a and thus causing a tapering of the inner chamber 5. The inserts 22 rest on the valve seat 7. Owing to the first recess 21a and the two second recesses 21b, the intermediate element has a zigzag shape, since the recess 21a extends into the intermediate element 21 from the direction of the valve inlet 11, whereas the two recesses 21b are formed into the intermediate element 21 in the axial direction from the valve seat 7. Thereby, it is guaranteed that the inserts 22 and the projection 3d extend axially in opposite directions from the magnetizable wall and are separated by the intermediate element 21. Thus, it is possible to generate the magnetic flux of the present invention through the wall 3, the valve body 13 and the guide elements 23.

Figure 3A:
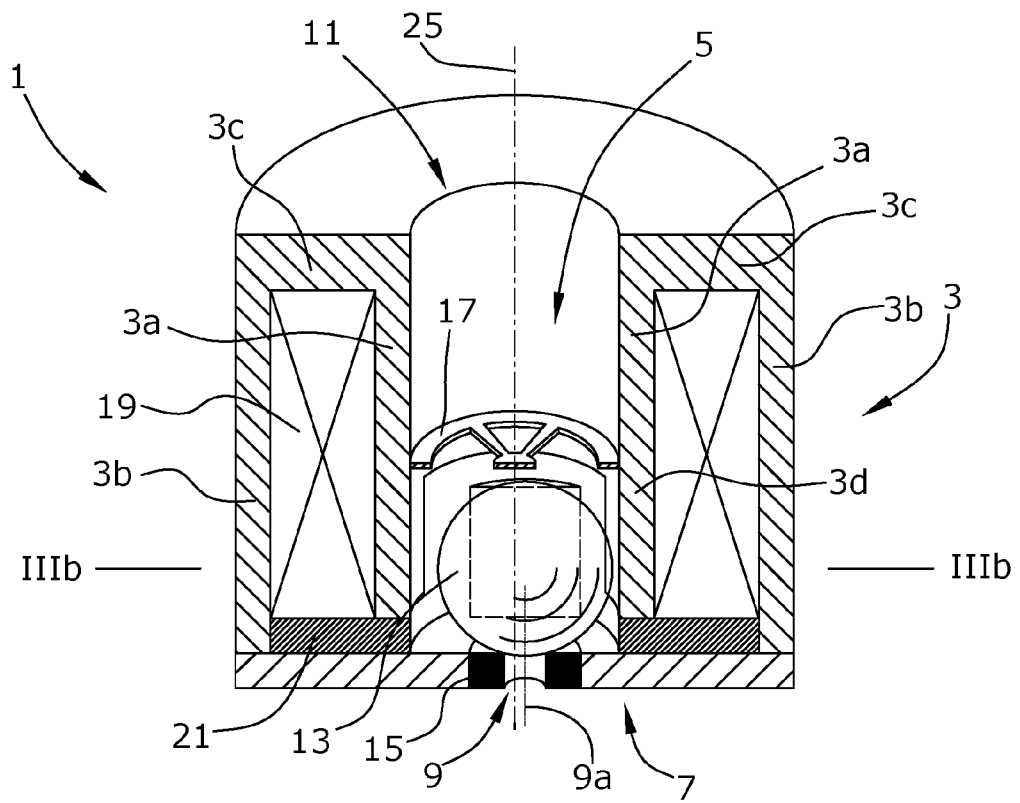
FIG. 3a shows a sectional view of a third embodiment of a valve device.
Figure 3B:
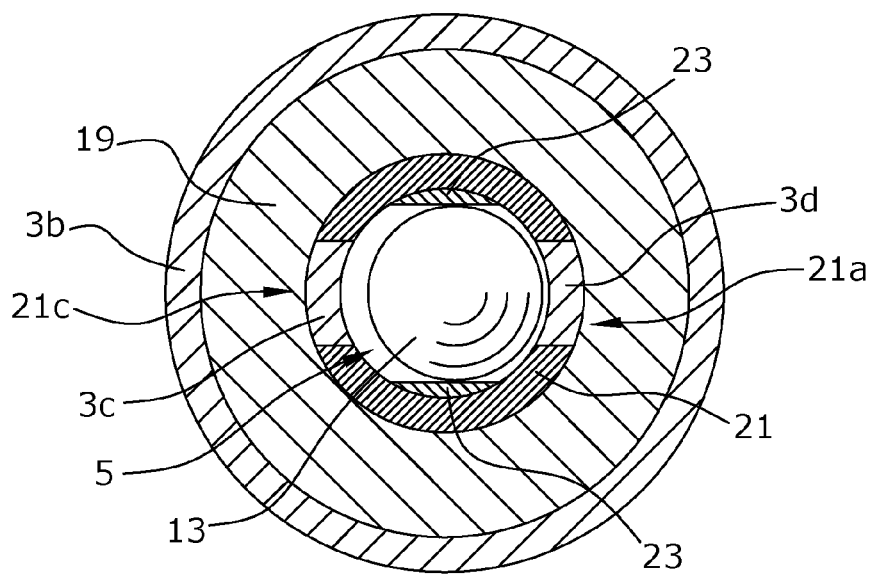
FIG. 3b shows a sectional view of a third embodiment of a valve device.

FIGS. 3a and 3b show schematic sectional views of a third embodiment of a valve device 1 of the invention. FIG. 3a is a longitudinal section, while FIG. 3b is a transversal section of the valve device 1. The embodiment of FIGS. 3a and 3b differs from the embodiment in FIG. 1 in that the valve opening 9 is arranged offset from the valve axis 25. Thus the valve opening 9 is shifted eccentrically towards the projection 3d. Thereby, a narrow gap is formed between the projection 3d and the valve body 13, whereby the magnetic reluctance can be maintained very low and a great force can be exerted on the valve body 13 during the opening movement.

In the embodiment illustrated in FIGS. 3a and 3b another first recess 21c may further be provided, which is situated opposite the first recess 21a. The inner leg 3a of the magnetizable wall 3 extends into the further first recess 21c by a further projection 3c. Due to the eccentric arrangement of the valve body an asymmetry is caused, wherein a greater magnetic force is exerted on the valve Body 13 by the projection 3d and the valve body is drawn towards the projection 3d to open the valve.

The guide elements 23 are designed in the same manner as in the embodiment illustrated in FIGS. 1a-1c.

Figure 4:
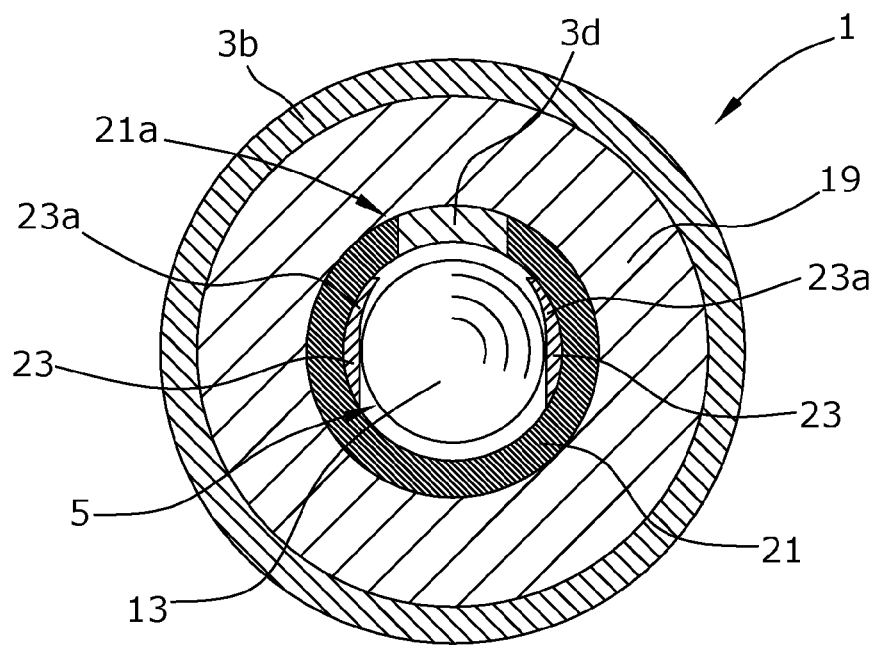
FIG. 4 shows a sectional view of a fourth embodiment of a valve device according to the invention.

FIG. 4 is a schematic sectional illustration of a fourth embodiment of a valve device 1 of the present invention. The illustration in FIG. 4 substantially corresponds to the illustration in FIG. 1b. The embodiment in FIG. 4 differs from the embodiment in FIGS. 1a-1c in that the guide elements 23 are formed curved towards the first recess 21a and thus to the projection 3d, with the distance between the two guide elements 23 decreasing. Thereby, the surface of the guide elements 23 facing the valve body 13 is adapted to the ball-shaped valve body 13 so that a large surface of the guide elements 23 can cooperate with the valve body 13 and that a very low magnetic reluctance is thus generated.

Figure 5:
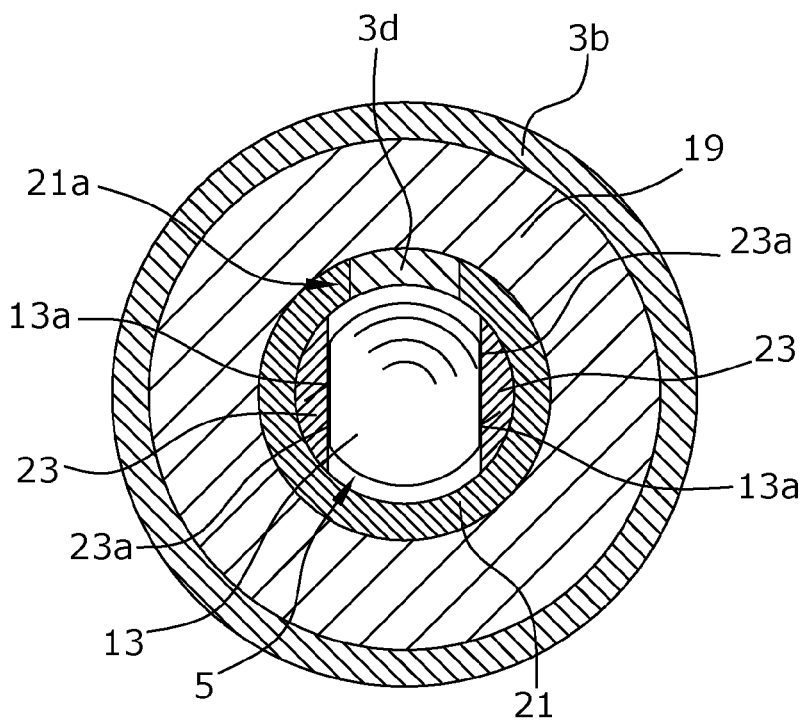
FIG. 5 shows a sectional view of a fifth embodiment of a valve device according to the invention with a barrel-shaped valve body.

FIG. 5 schematically illustrates a fifth embodiment of a valve device of the present invention in section. The illustration in FIG. 5 substantially corresponds to the illustration in FIG. 1b. The embodiment in FIG. 5 differs from the embodiment in FIGS. 1a-1c in that the valve body 13 is barrel-shaped instead of being ball-shaped. Further, the guide elements 23 which also extend into the inner chamber 5 from the valve seat not shown in FIG. 5, are thicker so that an advantageous guiding of the valve body 13 may be obtained.

Owing to the barrel shape, the valve body has two opposite flat portions 13a extending in parallel with the surface of the guide elements 23. Thereby, a short effective surface is formed between the valve body 13 and the guide elements 23, so that a very low magnetic reluctance is obtained. Owing to the barrel shape, the valve body is advantageously suited to seal the valve opening. Further it is possible, due to the barrel shape, the valve body 13 can roll towards the projection 3d in a simple manner when the valve is actuated.

FIGS. 6a and 6b schematically illustrate a sixth embodiment of a valve device 1 of the present invention. FIG. 6a is a longitudinal section of the valve device 1. FIG. 6b is a transversal section of the valve device 1. The valve device 1 illustrated in FIGS. 6a and 6b has a valve seat 7 with three valve openings 9. Each of the valve openings 9 is enclosed by a sealing insert 15. Further, three ball-shaped valve bodies 13 are arranged in the inner chamber 5. Each valve body 13 is assigned to a valve opening 9. The valve bodies 13 are separated from each other by a total of three guide elements 23 extending in an axial direction from the valve seat 7 into the inner chamber 5. The wall 3 surrounding the inner chamber 5 is interrupted at the inner leg 3a by an intermediate element 21, wherein three first recesses 21a are formed into which projections 3d of the inner leg 3a of the wall 3 extend. The guide elements 23 are arranged offset with respect to the projections 3d. Further, each projection 3d is assigned to one of the valve bodies 13. In FIGS. 6a and 6b, the valve is illustrated in the open position, with the magnetic flux lines being shown schematically. Each guide element 23 cooperates with two valve bodies 13, the valve bodies 13 and the guide elements 23 being arranged alternating in the circumferential direction of the inner chamber 5.

When the valve device 1 is actuated, the magnetic flux runs from the magnetizable wall 3 through the guide elements 23 into the valve bodies 13 and from there into the projections 3d and back into the wall 3. A magnetic force is generated between each projection 3d and the respective assigned valve bodies 13, which force draws the respective valve body 13 towards the projection 3d, thereby clearing the valve openings 9.

Figure 7:
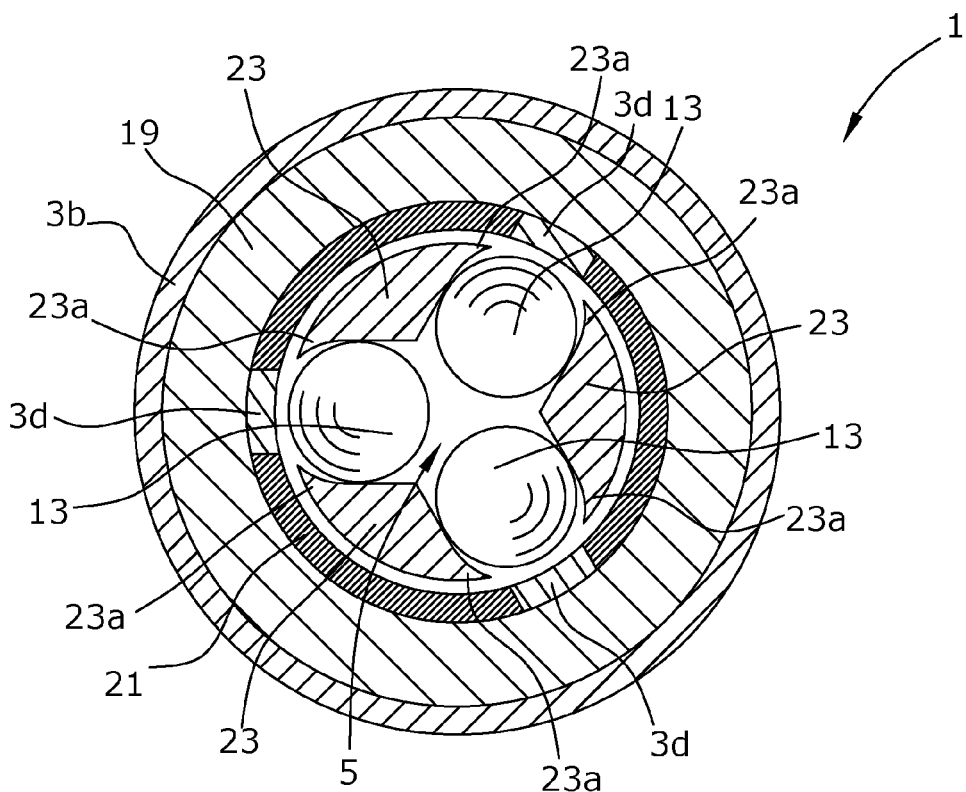
FIG. 7 shows a further embodiment of a valve device with three valve bodies.

FIG. 7 illustrates a variation of the embodiment of the valve device 1 of the present invention illustrated in FIGS. 6a and 6b. The illustration in FIG. 7 substantially corresponds to the illustration in FIG. 6b. The embodiment in FIG. 7 differs from the valve device 1 illustrated in FIGS. 6a and 6b in that the surfaces 23a facing the valve bodies 13 are curved and are thus adapted to the shape of the valve bodies 13. The functionality of the valve device 1 illustrated in FIG. 7 substantially corresponds to the functionality of the embodiment illustrated in FIG. 4.

Figure 8:
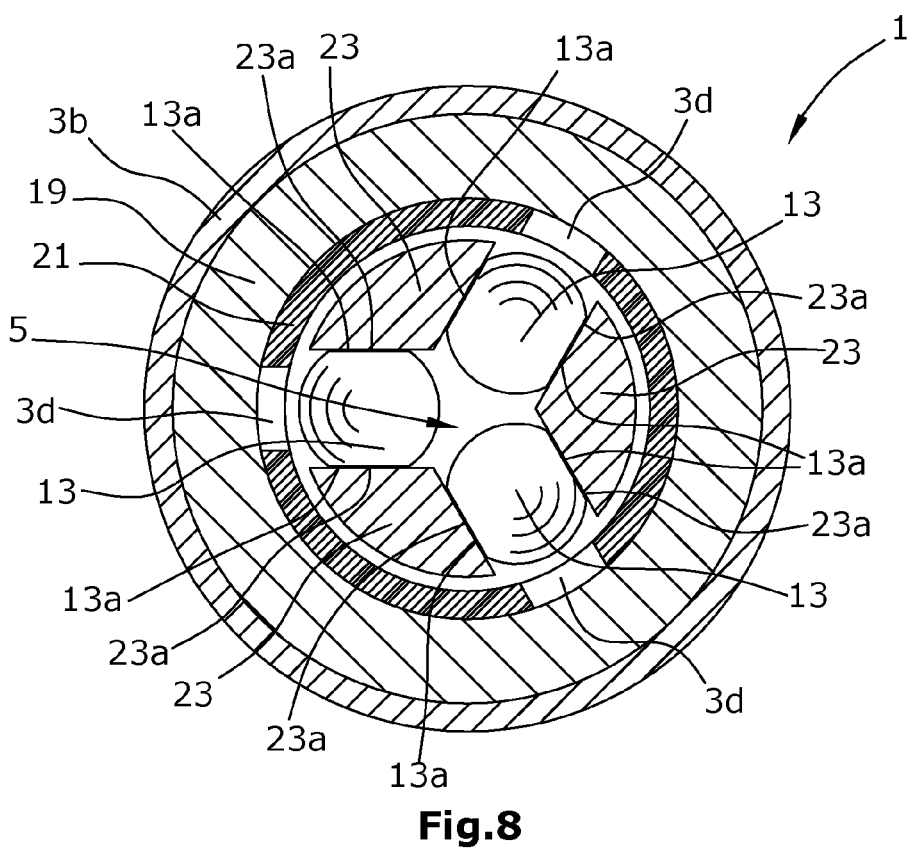
FIG. 8 show two further embodiments of a valve device according to the invention with three valve bodies.

FIG. 8 schematically illustrates another embodiment of the valve device 1 of the present invention in section. The embodiment I FIG. 8 is another variation of the valve device 1 illustrated in FIGS. 6a and 6b. The illustration in FIG. 8 substantially corresponds to the illustration in FIG. 6b. The embodiment in FIG. 8 differs from the valve device 1 of the embodiment in FIGS. 6a and 6b in that the valve bodies 13 are not ball-shaped, but barrel-shaped. Thus, the balls have respective opposite flat parts 13a extending in parallel with the surfaces 23a of the guide elements 23. Thereby, the guide elements 23 cooperate over a large surface with the flat parts 13a of the valve bodies 13 via the surfaces 23a, with a very low magnetic reluctance existing between the guide elements 23 and the valve bodies 13. The functionality of the embodiment of FIG. 8 substantially corresponds to the functionality of the embodiment in FIG. 5.

The barrel shape of the valve bodies 13 advantageously allows the sealing of the valve openings. Further, when the valve device 1 is actuated, the valve bodies 13 can roll advantageously over round surfaces towards the projections 3d, where an advantageous guiding of the valve bodies 13 is effected by the flat part 13a and the surfaces 23a of the guide elements 23.

In the valve devices 1 of the present invention the valve bodies 13 are pressed onto the sealing insert 15 by only the differential pressure between the valve inlet 11 and the valve outlet formed by the valve opening 9. The valve device is opened when the magnetic field is activated via the magnet arrangement 19.

The invention claimed is:
1. Magnetically actuatable valve device, comprising:
an inner chamber delimited by at least one wall comprising magnetizable material, which wall forms a valve seat, and a magnet arrangement which generates a magnetic circuit with a magnetic flux running in the magnetizable wall, and at least one magnetizable valve body moveable in the inner chamber, wherein at least one intermediate element is arranged in the magnetizable wall extending around the inner chamber and having a reduced magnetic conductivity in comparison with the magnetizable wall, wherein the intermediate element comprises a first recess into which a projection of the magnetizable wall extends,
wherein two guide elements made of magnetizable material are arranged in the inner chamber on opposite sides of the valve body and offset from the first recess, wherein the guide elements guide the valve body and wherein the guide elements together with the wall form the magnetic circuit, wherein the magnetic flux runs through the wall, the valve body, and guide elements.

2. Valve device of claim 1, wherein the guide elements cause a taper in the inner chamber.

3. Valve device of claim 1, wherein the guide elements are formed by mag-netizable inserts into the magnetizable wall, the inserts extending into second recesses of the intermediate element.

4. Valve device of claim 1, wherein the guide elements are formed by tongues extending axially in parallel with the intermediate element.

5. Valve device of claim 1, wherein the projection and the guide elements extend axially in opposite directions from the magnetizable wall.

6. Valve device of claim 1, wherein the guide elements extend axially from the valve seat into the inner chamber.

7. Valve device of claim 1, wherein the valve seat has a valve opening offset from the valve centre axis.

8. Valve device of claim 1, wherein the at least one valve body is ball-shaped or barrel-shaped.

9. Valve device of claim 1, further comprising three valve bodies, three valve openings in the valve seat, three first recesses in the intermediate element into which the wall extends by a respective projection, and three guide elements arranged offset from the three first recesses, two guide elements laterally surrounding and guiding one of the valve bodies, respectively.

* * * * *